US009729936B2

United States Patent
Howe

(10) Patent No.: US 9,729,936 B2
(45) Date of Patent: Aug. 8, 2017

(54) INTERFERENCE REDUCTION FOR UPSTREAM SIGNALS IN COMMUNICATION NETWORKS

(71) Applicant: ARRIS Enterprises, Inc., Suwanee, GA (US)

(72) Inventor: Jeffrey Joseph Howe, West Chicago, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/942,677

(22) Filed: Nov. 16, 2015

(65) Prior Publication Data

US 2017/0142493 A1 May 18, 2017

(51) Int. Cl.
*H04N 7/173* (2011.01)
*H04N 21/61* (2011.01)
*H04L 29/08* (2006.01)
*H04N 21/442* (2011.01)
*H04N 21/426* (2011.01)

(52) U.S. Cl.
CPC ....... *H04N 21/6156* (2013.01); *H04L 67/303* (2013.01); *H04N 21/426* (2013.01); *H04N 21/44245* (2013.01)

(58) Field of Classification Search
CPC ............. H04N 21/6156; H04N 21/426; H04N 21/44245
See application file for complete search history.

(56) References Cited

U.S. PATENT DOCUMENTS

| 8,670,481 | B2 | 3/2014 | Fox |
| 2009/0320086 | A1* | 12/2009 | Rijssemus ........... H04L 12/2861 725/127 |
| 2011/0258677 | A1* | 10/2011 | Shafer ..................... H04B 3/36 725/116 |
| 2013/0276047 | A1* | 10/2013 | Chapman ......... H04N 21/42676 725/111 |

(Continued)

OTHER PUBLICATIONS

Related Application, entitled "Systems and Methods for Preventing Energy Leakage in Communications Systems", U.S. Appl. No. 14/581,176, filed Dec. 23, 2014.

*Primary Examiner* — Kyu Chae
(74) *Attorney, Agent, or Firm* — Lori Anne D. Swanson

(57) ABSTRACT

Particular embodiments identify customer premise equipment (CPE) in a subscriber's premises that may potentially cause interference with other devices. For example, the interference may occur within an interfering spectrum where an interfering CPE transmits upstream in a frequency band that is the downstream frequency band for other customer premise equipment, such as legacy CPEs. Once the CPE is identified, when the CPE sends a request to initialize the CPE on the network, a cable modem termination service (CMTS) may adjust the target power level for a transmitter transmitting upstream content within the interfering frequency spectrum. For example, for those CPEs that transmit upstream using upstream channels within an interfering spectrum, such as within 54-85 MHz, the power level for these CPE may be reduced. Other CPEs that are not transmitting upstream in this interfering spectrum may not have their power reduced.

20 Claims, 7 Drawing Sheets

(56) References Cited

U.S. PATENT DOCUMENTS

| | | | |
|---|---|---|---|
| 2014/0233710 A1* | 8/2014 | Tu | H04B 3/487 |
| | | | 379/32.04 |
| 2015/0067756 A1* | 3/2015 | Kraiman | H04N 7/104 |
| | | | 725/127 |
| 2015/0143475 A1* | 5/2015 | Song | H04L 63/08 |
| | | | 726/4 |
| 2016/0112734 A1* | 4/2016 | Williams | H04H 20/78 |
| | | | 725/118 |

* cited by examiner

INTERFERENCE REDUCTION FOR UPSTREAM SIGNALS IN COMMUNICATION NETWORKS

BACKGROUND

Cable television (CATV) networks have evolved significantly since first being deployed as systems that delivered video channels one-way from a content provider. These early systems included transmitters that assigned a number of CATV channels among several frequency bands, each of approximately 6 MHz, multiplexed those signals, and sent them to subscribers as an electrical signal through a network of coaxial transmission lines to cable modems or set-top boxes in subscribers premises. Early evolution of such systems permitted limited return communication from the subscribers back to the content provider either through telephone lines or a dedicated, small, low-frequency signal propagated onto the coaxial network.

As the cable television infrastructure evolves, the upper boundary of the upstream band (e.g., return band) frequency in a CATV system may be extended by increasing the frequency of the split between the upstream band (e.g., upstream channel) and the downstream band (e.g., forward band); this allocates more bandwidth to the upstream band. The upstream band is dedicated to the transport of signals from customer premise equipment (e.g., set-top boxes or other components) to the CATV head end, and the downstream band is dedicated to the transport of signals from the CATV head end to the customer premise equipment. Extending the upstream band will enable more upstream bandwidth capacity due to the increased upstream spectrum. However, reallocating spectrum to the upstream consumes a portion of the spectrum previously dedicated to the downstream band. Thus, increasing the upper boundary of the upstream band frequency may interfere with CATV components that still communicate or require downstream communication signals that fall within the frequency reallocated to the upstream band.

When multiple service operators (MSOs) start providing higher-speed services using a higher-split architecture, such as a mid-split or high-split architecture, the upstream signals from customer premise equipment may interfere with other, older legacy devices that still receive downstream signals within the same frequency spectrum. For example, using a mid-split architecture where customer premise equipment in the subscriber's premises transmits upstream within the 5-85 MHz upstream spectrum, legacy devices still receive downstream signals within the 54-85 MHz band. The customer premise equipment that transmits upstream in the 54-85 MHz band may cause issues with the older legacy devices.

DETAILED DESCRIPTION

Figure 1:
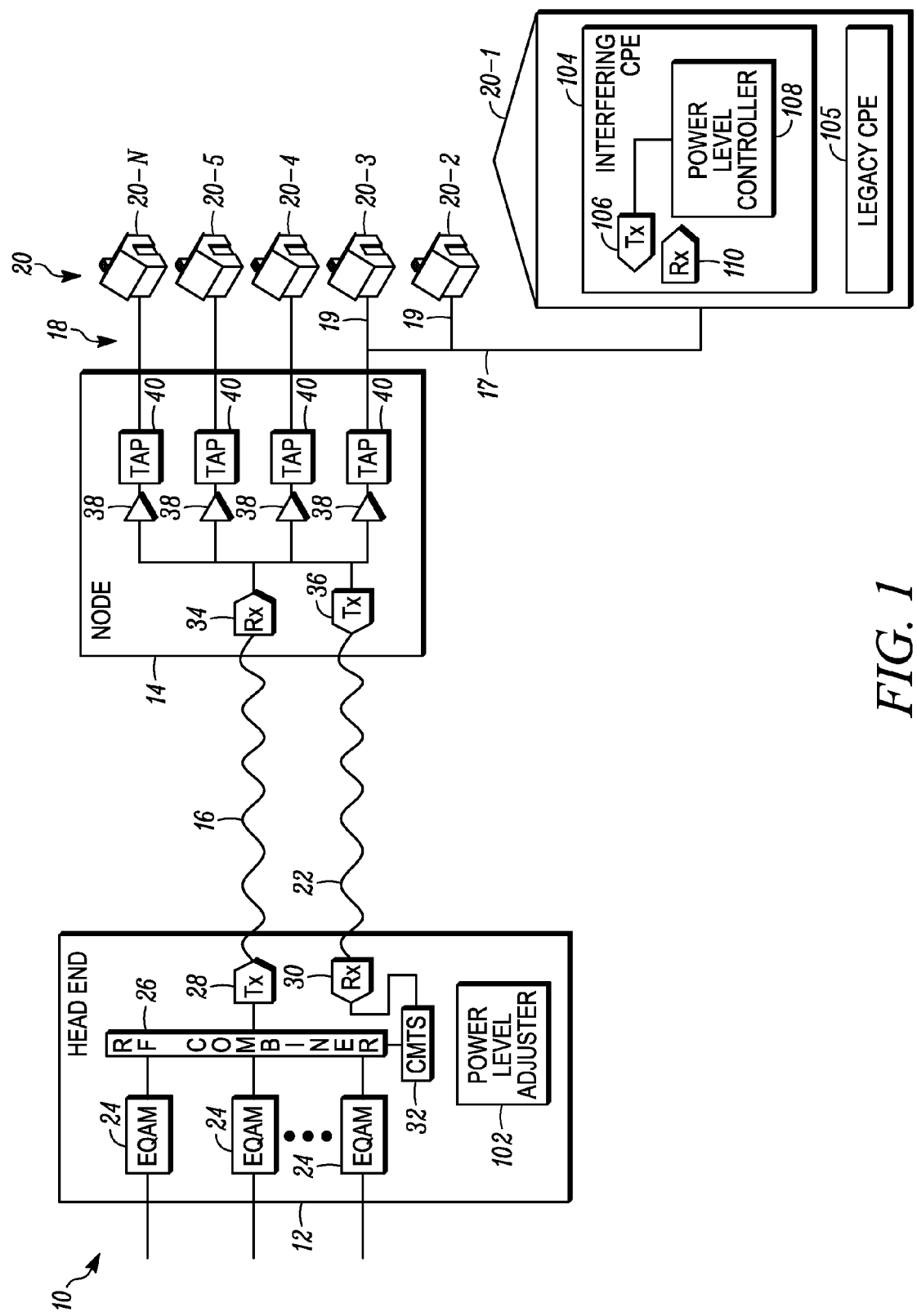
FIG. 1 depicts a simplified system of a network to send and receive content according to one embodiment.

Described herein are techniques for a system to reduce interference in communication networks. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments identify customer premise equipment (CPE) in a subscriber's premises that may potentially cause interference with other devices. For example, the interference may occur within an interfering spectrum where an interfering CPE transmits upstream in a frequency band that is the downstream frequency band for other customer premise equipment, such as legacy CPEs. In one embodiment, the interfering spectrum may be within the 54-85 MHz frequency spectrum, but other frequency ranges may be appreciated.

Once the CPE is identified, when the CPE sends a request to initialize the CPE on the network, a cable modem termination service (CMTS) may adjust the target power level for a transmitter transmitting upstream content within the interfering frequency spectrum. For example, for those CPEs that transmit upstream using upstream channels within an interfering spectrum, such as within 54-85 MHz, and cause interference with other CPEs, the power level for these CPE may be reduced. Other CPEs that are also transmitting upstream in this interfering spectrum but not causing interference may not have their power reduced. By reducing the power of the transmitter of the interfering CPE, interference with other CPEs within the subscriber's premises, or other premises connected to TAPs outside of the premises, have interference minimized. Particular embodiments identify interfering CPEs on a per-CPE basis and reduce the power level per individual CPE.

In one embodiment, physically, existing downstream cable television (CATV) content originates on the network from a head end, which includes a CMTS. In the CMTS there is typically a plurality of EdgeQAM (Edge Quadrature Amplitude Modulation) units, which each receive encoded video signals, audio signals, and/or Internet Protocol (IP) signals, and which each directly output a spectrum of amplitude-modulated analog signals at a defined frequency or set of frequencies to a radio frequency (RF) combining network.

The RF combining network in turn delivers the combined, modulated signals to a transmitter that converts the analog signals to optical signals and propagates those signals to a fiber optic network along a forward path to a receiver in a node. The node, in turn, converts the received optical signals back into electrical signals so that they may be delivered to subscribers through coaxial cables that terminate in the subscriber's homes. The node, conversely will also have equipment capable of receiving electrical signals from customer premise equipment (CPE) of the subscribers, converting them to optical signals, and sending the optical signals to the CMTS along the fiber optic network, where the head end has a receiver capable of decoding and converting the signals back to the analog domain, respectively.

In the specification, the drawings, and the claims, the terms "forward path" and "downstream" may be interchangeably used to refer to a path from a head end to a node, a node to an end-user, or a head end to an end user. Conversely, the terms "return path", "reverse path" and "upstream" may be interchangeably used to refer to a path from an end user to a node, a node to a head end, or an end user to a head end. Also, it should be understood that, unless stated otherwise, the term "head end" will also encompass a "hub," which is a smaller signal generation unit remote from a head end, often used for community access channel insertion and other purposes, that generally mimics the functionality of a head end, but may typically not include equipment such as satellite dishes and telephone equipment.

System Overview

FIG. 1 depicts a simplified system 10 of a network to send and receive content according to one embodiment. System 10, which may include a CATV Hybrid Fiber-Coaxial (HFC) network, includes a head end 12 that delivers content over a forward path to a node 14 using an optical transmission line 16. The node 14 may in turn deliver content to a plurality of CPEs for subscribers 20-1-20-N over a coaxial network 18. Subscriber's premises are typically connected to the node 14 using trunk cables 17 and feeder cable or "taps" 19. The HFC network may likewise transmit signals over a return path from each of the subscribers 20 to the node 14 through the coaxial network 18, which in turn transmits the return path signal to the head end 12 through an optical transmission line 22.

The head end 12 may modulate a plurality of cable channels using one or more EdgeQAM (EQAM) units 24. The respective channels may be combined by an RF combining network 26 that multiplexes the signals and uses the multiplexed signal to modulate an optical transmitter 28 (e.g., a laser) that delivers the optical signal to transmission line 16. The head end 12 may also include an optical receiver 30 that receives return path signals from the optical transmission line 22 and delivers the return path signals to a CMTS 32, which instructs each of the CPEs (e.g., cable modems) when to transmit return path signals, such as Internet Protocol (IP) based signals, and which frequency bands to use for return path transmissions. The CMTS 32 demodulates the return path signals, translates them into (IP) packets, and redirects them to a central switch (not shown) that transmits the IP packets to an IP router for transmission across the Internet. It should be understood by those skilled in the art that this configuration may be modified in any number of manners. For example, one or more of the EQAM units may be analog modulated or digitally modulated, or may be directly modulated in a Converged Cable Access Platform (CCAP). Similarly, the head end may include an A/D converter between the RF combining network 26 and the optical transmitter 28 so as to modulate the optical signal to the node using a digital rather than an analog signal.

The node 14 includes an optical receiver 34 to receive a forward path signal from the head end 12 over the optical transmission line 16, along with an optical transmitter 36 to send the return path signals to the head end 12 over the optical transmission line 22. The optical receiver 34 is capable of demultiplexing a received optical signal and using the demultiplexed signals to modulate respective RF signals sent to subscribers 20 through a network of amplifier units 38 and diplexers or taps 40.

As noted previously, the respective RF signals communicated between the node 14 and the subscribers 20 include both forward path and reverse path transmissions, both typically carried over a common coaxial cable, but in some cases may be carried over optical transport. To carry forward and return path signals over the same coaxial cable, different bands of the RF spectrum are assigned to each of the forward path (high band or downstream band) and the return path (low band or upstream band), and are typically separated by a guard band or crossover band to prevent signal interference between the respective signals.

As can be appreciated from FIG. 1, the node 14 is capable of separately processing the forward and return path signals that are propagated on the same coaxial cable. In FIG. 1 for example, CATV amplifiers, such as the amplifier units 38, amplify the forward path signal and the return path signal simultaneously. Thus, the amplifier units 38 may typically be operatively connected to a minimum of two diplex filters (e.g. TAPs 40)—a first diplex filter that separates the return path from the forward path, after which these RF signals are separately amplified, and then a second diplex filter that recombines the separated signals onto a common coaxial cable sent to a subscriber 20 or to a head end 12.

As the required bandwidth for the forward path and/or the return path changes over time when CATV broadcast systems evolve, the frequency ranges for the forward and return path will vary. For example, the DOCSIS (Data Over Cable Service Interface Specifications) 1.x standard was initially released in March 1997 and called for a downstream throughput of approximately 43 Mbps and an upstream throughput of approximately 10 Mbps along a minimum of one channel, and which accordingly permitted return path frequencies within the 5-42 MHz range (low split). DOCSIS 2.0, released in late 2001 required an improved upstream throughput of approximately 31 Mbps, again for a minimum of one channel. DOCSIS 3.0, released in 2006 required that the DOCSIS 2.0 throughput standards of 43 Mbps and 31 Mbps, respectively, be provided along a minimum of four channels in each direction, and which permitted return path frequencies within the 5-85 MHz range (mid split). The DOCSIS 3.1 platform is supports capacities of at least 10 Gbps downstream and 1 Gbps upstream using 4096 QAM, and which would permit return path frequencies to the 5-204 MHz range (high split). DOCSIS 3.1 replaces the 6 MHz and 8 MHz wide channel spacing with smaller 20 kHz to 50 kHz orthogonal frequency division multiplexing (OFDM) subcarriers, which can be bonded inside a block spectrum that could end up being about 200 MHz wide.

Though the DOCSIS standards have been (and continue to be) upgraded over time, many CATV systems delivering content to customers may lag the maximum capabilities permitted by standards for a considerable period of time while equipment is gradually upgraded. For example, upstream transmissions under the DOCSIS 3.0 standard in the United States are permitted within the 5-85 MHz band, while in Europe upstream transmissions are assigned the 5-65 MHz band. Nonetheless, many legacy CPEs in CATV systems in the United States, for example, still propagate upstream content in the 5-42 MHz band with downstream content propagated in the 54-750 MHz band. It can be expected that multiple service operators (MSOs) will continue to provide content to different CPEs at respectively different frequency splits between upstream and downstream transmissions, as providers are expected to gradually transition to broader spectrum assigned to both the upstream and downstream transmissions to accommodate greater demand for content and data services, such as Video on Demand and ever-increasing need for additional Internet bandwidth. For instance, MSOs have upgraded particular equipment to accommodate a mid-split architecture where upstream transmissions are assigned the 5-85 MHz band, and also use a high-split architecture where upstream transmissions are assigned the 5-204 MHz band.

Such transitions to higher splits will likely cause problems to subscribers as the high upstream energy transmitted from the CPEs may get coupled and received by the other devices in the home that are designed to receive signals at 54 MHz frequency and above. For discussion purposes, CPEs that transmit within the interfering spectrum are referred to as "interfering CPEs", and CPEs that do not transmit upstream entirely within the interfering spectrum are referred to as "other CPEs" or "legacy CPEs". In one example, a subscriber in a first subscriber premises who has a legacy CPE 105, such as a television (TV) or a set top box (STB), may upgrade to an interfering CPE 104, such as a cable modem, gateway, STB, or TV, that utilizes a higher split frequency between upstream and downstream transmissions, such as 5-85 MHz mid-split, for example. Yet other devices inside the home, such as legacy CPE 105, may be configured to receive downstream transmissions in the 54-750 MHz band. Thus, the upstream energy in the 54-85 MHz band will tend to leak into and over saturate other devices inside the subscriber's home, which may have automatic gain control (AGC) circuits that react to the high power signals at the input and reduce the gain of the amplifier inside those devices which in turn will reduce the level of the desired TV signals that may have low levels already. For instance, an upstream signal emanating from interfering CPE 104 may interfere with the legacy CPE 105 by sending an upstream signal through a first path that begins at interfering CPE 104, but propagates back to legacy CPE 105 via a splitter (not shown). Also, legacy CPE 105 could receive interference from a second path that begins at interfering CPE 104, but produces a reflection that bounces off the tap 40 to again propagate back to legacy CPE 105.

Furthermore, as noted earlier, such interference is not limited to the subscriber premises 20-1 in which interfering CPE 104 is present. For example, an upstream signal can travel along a third path that begins at interfering CPE 104, but produces a reflection that bounces off the tap 40 to propagate back to a legacy CPE 105 in any neighboring subscriber premises 20-2 and 20-3 served by the same tap 40 as subscriber premises 20-1. In a typical case, interference from this third path may produce a drop of approximately 14 db in the signal to legacy CPE 105, but in a worst case the loss could be approximately 25 dB. Other subscriber premises coupled to a second tap 40 that is coupled to the same tap 40-1 as subscriber premises 20-1 may also experience a loss.

Though diplex filters exist in the CATV architecture from the head end to the node so as to separate upstream and downstream signals, there are no diplex filters inside the subscriber premises or in a tap to filter such interfering signals. Moreover, installing such diplex filters (or lowpass filters or other analogous filters) would not only be an arduous and cost-prohibitive process, but there is no guarantee that such equipment would not be subsequently misplaced or damaged by customers. In the same vein, other solutions such as the use of taps/splitters with high isolation, etc. have high cost and/or operational complexity. Further, gateways that include two ports that separate the 85 MHz upstream traffic from the legacy CPEs 104 require upgrading the gateways. Particular embodiments do not use these solutions to overcome the interference.

To address the above interference between interfering CPEs 104 and legacy CPEs 105, CMTS 32 can identify interfering CPEs 104 in subscriber premises 20 that may transmit upstream in an interfering spectrum. For example, interfering CPE 104 may transmit upstream in a channel, such as a 6.4 MHz channel, within the 54-85 MHz frequency spectrum. In this case, interfering CPE 104 may be a DOCSIS 3.0 (or 3.1 or any subsequent iterations) cable modem that may transmit upstream in a mid-split architecture, such as from 5-85 MHz. As described above, legacy devices still receive downstream signals within the 54-85 MHz band. Thus, the interfering spectrum is from 54-85 MHz. Other ranges of interfering spectrum may be appreciated depending on the different upstream/downstream splits between interfering CPEs 104 and legacy CPEs 105.

Using DOCSIS 3.0, interfering CPE 104 may transmit upstream using narrow channels, such as 6.4 MHz. This may be different from DOCSIS 3.1 cable modems which transmit upstream in a wider channel up to 192 MHz. When transmitting upstream in the narrow channel, CPE 104 transmits entirely within the interfering spectrum; that is, the 6.4 MHz channel is located entirely within the interfering frequency spectrum of 54-85 MHz. When using DOCSIS 3.1, the CPE may transmit in 192 MHz channels that may only partly overlap in the interfering spectrum CMTS 32 may determine that interfering CPE 104 transmits within the interfering spectrum, such as by analyzing the frequencies of channels CPEs 104 are transmitting in. Once an interfering CPE 104 has been identified as actually causing interference, this information can be conveyed to a power level adjuster 102 and it may then adjust the power level of a transmitter 106 of interfering CPE 104.

In one embodiment, interfering CPE 104 may send a request, such as a ranging request, that requires a response from CMTS 32. The ranging request may be used to initialize interfering CPE 104 when interfering CPE 104 becomes online and also for periodic maintenance after the initialization. Interfering CPE 104 needs to receive a response from CMTS 32 to continue transmitting to head end and receiving content from head end 12. When CMTS 32 receives the request, power level adjuster 102 may identify this interfering CPE 104 as transmitting upstream within the interfering spectrum. Power level adjuster 102 may then determine a reduced target power level for this CPE 104. The reduced target power level may be a power level that is lower than a normal target power level that other CPEs use to transmit upstream where these other CPEs are not causing interference within the interfering spectrum. These CPEs may not be causing interference because although may be transmitting in the interfering band, the other CPEs are not actually causing problems for the legacy CPEs. This may be due to there being no legacy CPEs in the same premises, the other CPEs might be already transmitting at a low enough power level relative to the desired downstream signal so that the signal is not causing problems, or perhaps filters have been installed to provide sufficient isolation between the transmitting CPE and the legacy CPE. Power level adjuster 102 may then send adjustments for the target power level to interfering CPE 104. In one embodiment, power level adjuster 102 sends the reduced target power level as a parameter in the response.

A power level controller 108 in interfering CPE 104 may then use the reduced target power level to control the power level for a transmitter 106 in the upstream direction. A receiver 110 in interfering CPE 104 is not affected by this target power level adjustment, and can still receive downstream content at a normal power level that other CPEs receive content.

When transmitter 106 transmits with the lower target power level, the interference with other devices either within the same subscriber premises 20-1 or other subscriber premises 20-2-20-N may be reduced. This is because the power in any reflected signals to the other devices may be reduced or eliminated due to the lower transmit power from interfering CPE 104. These reflected signals thus may have power levels below a level that does not adversely affect these other devices. The reduction of the target power may reduce the signal-to-noise ratio (SNR) or modulation error range (MER) of transmitter 106. This may affect the throughput and operation of interfering CPE 104. However, the minimization of in-premises interference may be more important. Also, because power level adjuster 102 performs the target power level adjustment on a per-CPE basis, the trade-off may be advantageous because only interfering CPEs 104 that transmit upstream in the interfering spectrum have their target power level adjusted instead of a wholesale change for all CPEs in general. That is, other CPEs 104 that that are not actually causing interference still transmit at a normal power level. Also, in one embodiment, if another interfering CPE 104 (e.g., DOCSIS 3.1 cable modems) transmits upstream in an upstream channel that only partially overlaps with the interfering spectrum, the power of this other CPE 104 may not be reduced as much as a channel that completely overlaps with the interfering spectrum.

Frequency Split Examples

Figure 2:
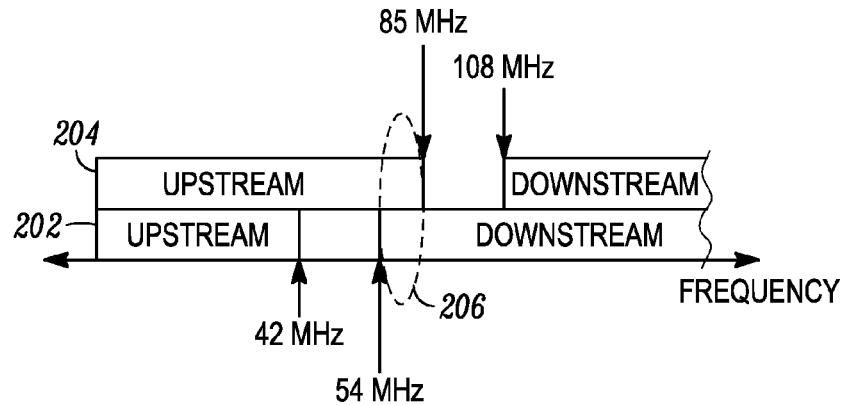
FIG. 2 depicts an example of different frequency splits for transmitting in the upstream and downstream directions according to one embodiment.

FIG. 2 depicts an example of different frequency splits for transmitting in the upstream and downstream directions according to one embodiment. A frequency split at 202 shows the upstream and downstream frequency bands for legacy devices that transmit upstream in an upstream band of 5-42 MHz frequency band and receive downstream transmissions in a downstream band of 54-750 MHz frequency band. There may be a crossover range between the upstream band and the downstream band from 42-54 MHz.

At 204, interfering CPEs 104 may transmit with the mid-split architecture. The frequency split shows an upstream band in the 5-85 MHz frequency band and a downstream frequency band in the range around 108 MHz-1002 MHz. DOCSIS 3.0 introduced optional specifications for having the upstream band from 5-85 MHz. DOCSIS 3.1 made the 85 MHz upstream band mandatory. It will be understood that these frequencies may vary slightly.

As shown at 206, there is an interfering spectrum in which part of the upstream band for frequency split at 204 conflicts with the downstream band for the frequency split at 202. In this case, the downstream band for the legacy CPEs 105 conflicts with the upstream band for interfering CPEs 104 in the frequency spectrum of 54-85 MHz. As discussed above, other frequency splits may be appreciated.

Signal Reflection

As discussed above, when interfering CPEs 104 transmit upstream in the interfering spectrum, the signal may reflect back downstream to other legacy CPEs 105 that receive downstream signals in the interfering spectrum. If at a high enough power level, the reflected signals may cause the intended downstream signals being sent to legacy CPEs 105 from being received properly.

Figure 3A:
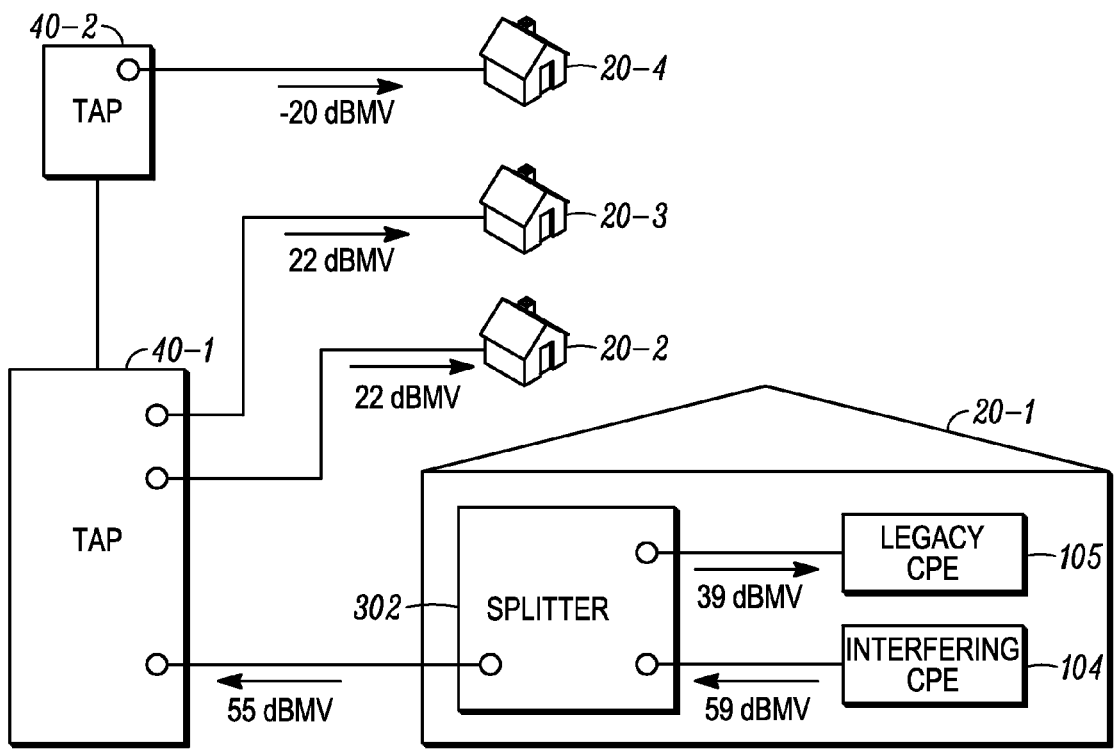
FIG. 3A shows an example of the reflection of a signal transmitted by an interfering CPE according to one embodiment.

FIG. 3A shows an example of the reflection of a signal transmitted by interfering CPE 104 according to one embodiment. In a subscriber premises 20-1, interfering CPE 104 transmits with a target power level of 59 decibels relative to one millivolt (dBmV). This may be the normal power level that interfering CPE 104 transmits signals upstream without any target level reduction. A splitter 302 within premises 20-1 may split the signal between interfering CPE 104 and legacy CPE 105. Legacy CPE 105 may be device, such as a television, set-top box, or other device, that may operate with the frequency split as described at 202 in FIG. 2. Interfering CPE 104 may be a device that operates with the frequency split shown at 204 in FIG. 2.

A 39 dBmV signal is reflected from splitter 302 downstream to legacy CPE 105 in the interfering frequency spectrum shown at 206 in FIG. 2. Splitter 302 may provide a 20 dBmV isolation. The isolation reduces the power of the signal transmitted from CPE 104 by 20 dBmV. The signal with the power level of 39 dBmV may affect the operation of legacy CPE 105 when in the downstream band of legacy CPE 105. For example, downstream signals to legacy CPE 105 may be masked by the reflected signal. Thus, it is not desirable to have such a high power signal being reflected into legacy CPE 105.

The signal transmitted by interfering CPE 104 may also be reflected into other devices outside of subscriber premises 20-1. For example, the signal experiences around a 4 dB less at splitter 302, and is then sent to TAP 40-1, which may be in node 14, and reflected back downstream into other subscriber premises coupled to TAP 40-1, such as subscriber premises 20-2 and 20-3. This signal is reflected back at a 22 dBmV power level. This signal may also interfere with the downstream signals transmitted to legacy CPEs 105 in these subscriber premises 20-2 and 20-3, which may be problematic if the downstream signal is received at a low power level.

TAP 40-1 may also be coupled to other TAPs, such as TAP 40-2. The signal may be reflected into another subscriber premises 20-4 coupled to TAP 40-2. However, the power level in this case may be −20 dBmV. This may not have a large effect on legacy CPEs 304 in this subscriber premises 20-4.

Figure 3B:
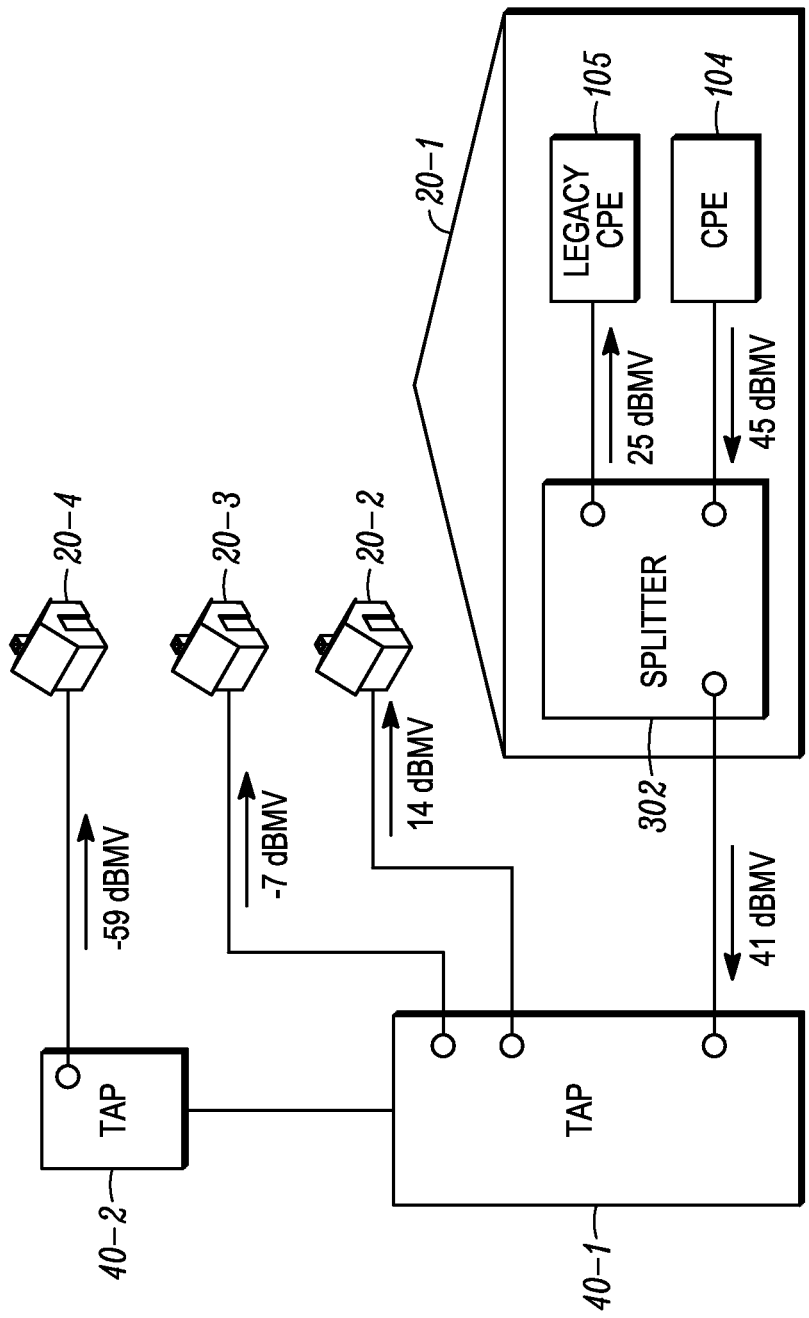
FIG. 3B shows an example where the target power level of the interfering CPE has been reduced according to one embodiment.

FIG. 3B shows an example where the target power level of CPE 104 has been reduced according to one embodiment. As is shown, in subscriber premises 20-1, the power level of 45 dBmV now reflects a signal at a much lower level (e.g., 25 dBmv) into legacy CPE 105 due to the 20 dBmV isolation at splitter 302. Further, the signal transmitted by interfering CPE 104 at 41 dBmV from splitter 302 is reflected at a 14 dBmV level to subscriber premises 20-2 and 20-3, and a −25 dBmV level into subscriber premises 20-4 due to the isolation between TAPs.

Interfering CPE Identification

To provide for the target power reduction on a per-CPE basis, power level adjuster 102 needs to identify CPEs 104 that are transmitting upstream in the interfering spectrum. This may be discovered in multiple ways. For example, characteristics of a CPE 104 may be analyzed to determine that it is transmitting upstream in the interfering spectrum. Also, power level adjuster 102 may use a flag that is set in a configuration file for CPE 104 to identify interfering CPEs 104. Additionally, each CPE 104 that is interfering may be provisioned on CMTS 32, or the type of CPE 104, such as the manufacturer, model number, etc. may be used to identify interfering CPEs 104.

Figure 4:
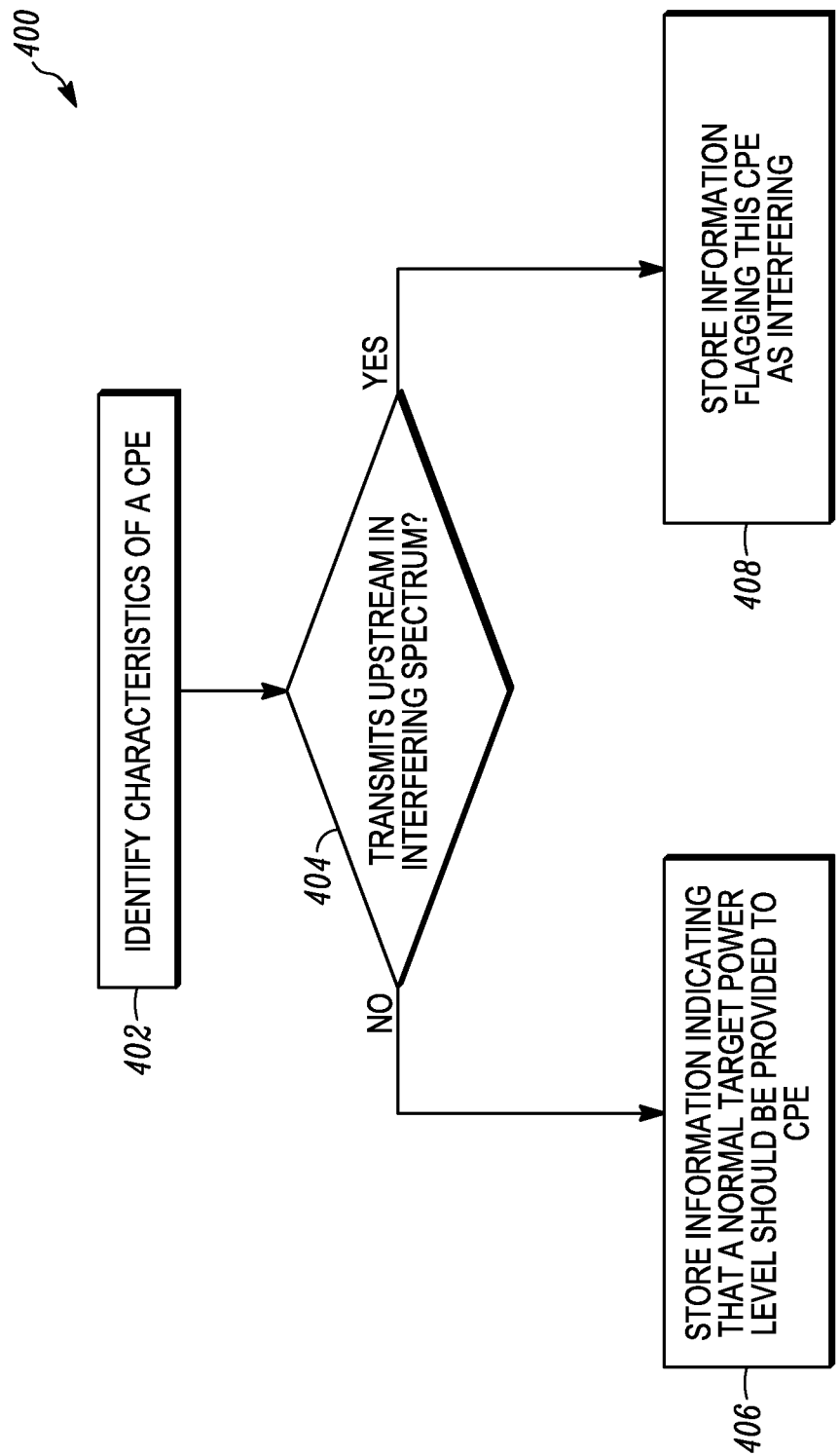
FIG. 4 depicts a simplified flowchart of a method for discovering CPEs that transmit upstream in the interfering spectrum according to one embodiment.

FIG. 4 depicts a simplified flowchart 400 of a method for discovering CPEs 104 that transmit upstream in the interfering spectrum according to one embodiment. At 402, CMTS 32 identifies characteristics of a CPE (either an interfering CPE 104 or legacy CPE 105). In this case, CMTS 32 may not know if the CPE is interfering or not. Power level adjuster 102 may identify the characteristics using different methods. For example, CMTS 32 may receive a signal from the CPE and identify characteristics of the CPE from the signal. Other methods of identifying characteristics may include reviewing a flag that may be set in the configuration file for the CPE. In one embodiment, the configuration file may be stored at CMTS 32 or retrieved from the CPE. Also, a profile for the CPE may be provisioned on CMTS 32 and power level adjuster 102 determines if the CPE 104 is configured to transmit upstream in the interfering spectrum. Another example may be based on the type of CPE, such as the model number, manufacturer, etc. CMTS 32 may determine the type of CPE based on the configuration file or profile for the CPE. The manufacturer and model number may be used to identify what protocols CPEs are using, such as DOCSIS 3.0 or DOCSIS 3.1, and/or which spectrum CPEs are configured to transmit upstream.

At 404, CMTS 32 determines whether the CPE transmits upstream in the interfering spectrum. This may be based on the characteristics determined at 402. If the CPE is not transmitting upstream in the interfering spectrum, then at 406, CMTS 32 may store information indicating that a normal target power level should be provided to the CPE. This may indicate the CPE is a legacy CPE 105. In other embodiments, no information may be stored as this is the normal target power level.

At 408, if CMTS 32 determines that the CPE transmits upstream in the interfering spectrum, CMTS 32 stores information flagging this CPE as an interfering CPE 104. The information may indicate that a lower target level for interfering CPE 104 may be used. Power level adjuster 102 may also calculate a target power level for this interfering CPE 104. The power level may be calculated for this specific interfering CPE 104 based on the characteristics for CPE 104. For example, depending on the possible interference, power level adjuster 102 may calculate different levels of the target power level for the transmitter of interfering CPE 104. The target power level reduction could be a provisioned value, or could be based on the absolute power level of the CPE. Also, some other system may determine the receive power levels on the legacy CPEs and use that info to determine reduced power level.

Power Level Adjustment

Figure 5:
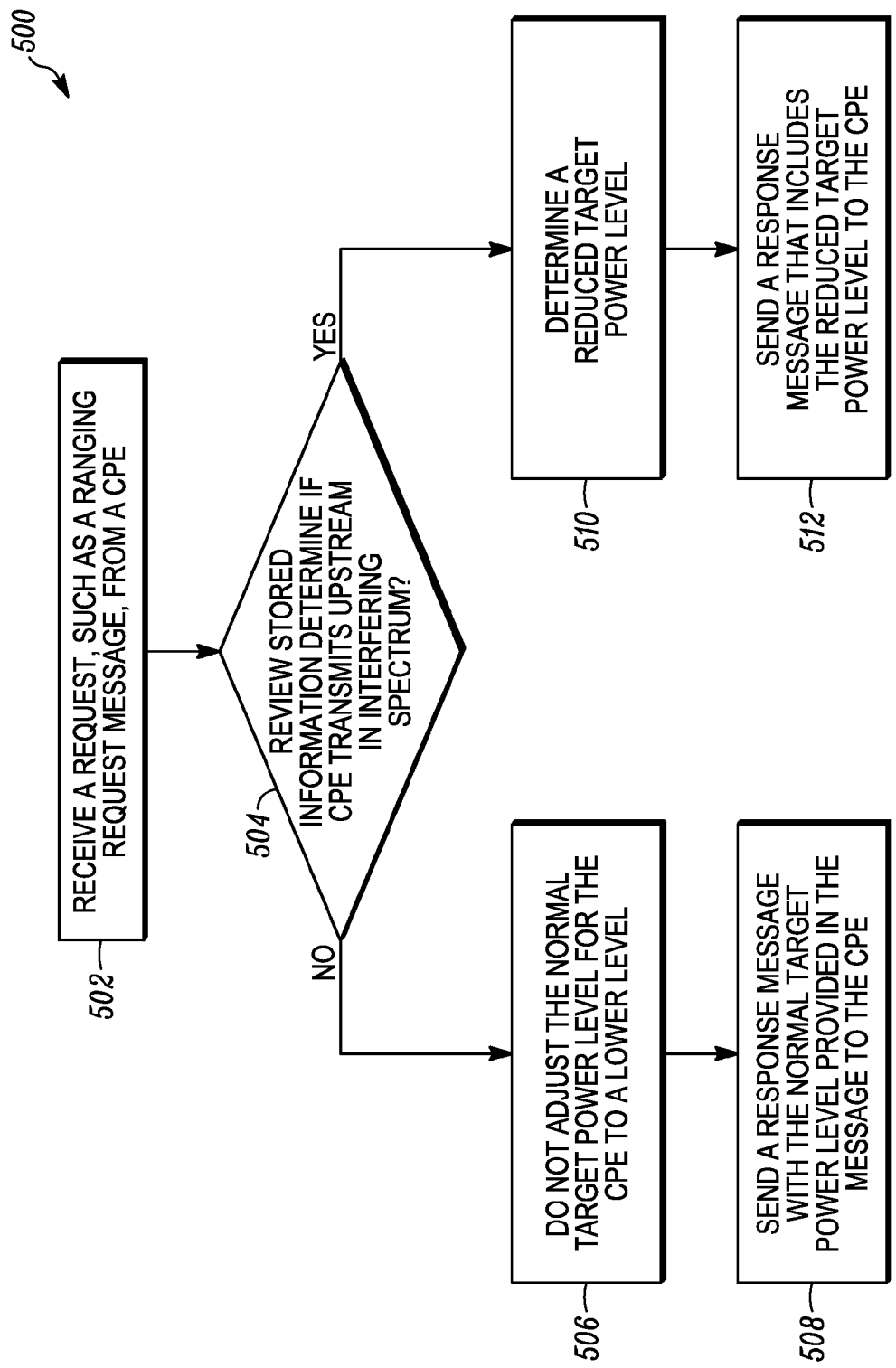
FIG. 5 depicts a simplified flowchart of a method for setting the target power level for the interfering CPE according to one embodiment.

After determining which CPEs 104 transmit upstream in the interfering spectrum, power level adjuster 102 may adjust the transmit target power level of interfering CPE 104. FIG. 5 depicts a simplified flowchart 500 of a method for setting the target power level for interfering CPE 104 according to one embodiment. At 502, CMTS 32 receives a request, such as a ranging request message, from a CPE. The request may be a ranging request for initializing the CPE in the channel or a periodic maintenance request for an already-initialized CPE. The periodic maintenance may occur periodically, such as every 25 seconds. The ranging request message may require a response from CMTS 32 for the CPE to continue operating. That is, the CPE cannot continue to receive content from head end or transmit content to head end until a response is received. If the CPE does not receive a response within a certain time period, the CPE cannot continue to transmit in its designated channel until one of its ranging requests are answered.

At 504, when CMTS 32 receives the ranging request, power level adjuster 102 may review the stored information to determine if this CPE is transmitting upstream in the interfering spectrum. Additionally, if the discovery process has not been performed previously, when the ranging request is received, power level adjuster 102 may perform the method described in FIG. 4.

Power level adjuster 102 determines if there is an issue with possible interference. At 506, if not, then power level adjuster 102 does not adjust the normal target power level for the CPE to a lower level. In one embodiment, the same normal power level may be used for all CPEs that do not transmit upstream in the interfering spectrum. Then, at 508, CMTS 32 sends a response message with the normal target power level provided in the message to the CPE.

At 510, if there is a possible interference issue, then power level adjuster 102 determines a reduced target power level. The reduced target power level may be determined based on different factors. For example, the same reduced target power level may be set for all interfering CPEs 104 that may transmit upstream in the interfering spectrum. Other methods of dynamically determining the power level were described above. At 512, CMTS 32 sends a response message that includes the reduced target power level to interfering CPE 104. For example, power level adjuster 102 sets a target power level parameter to a lower value in the response message.

Figure 6:
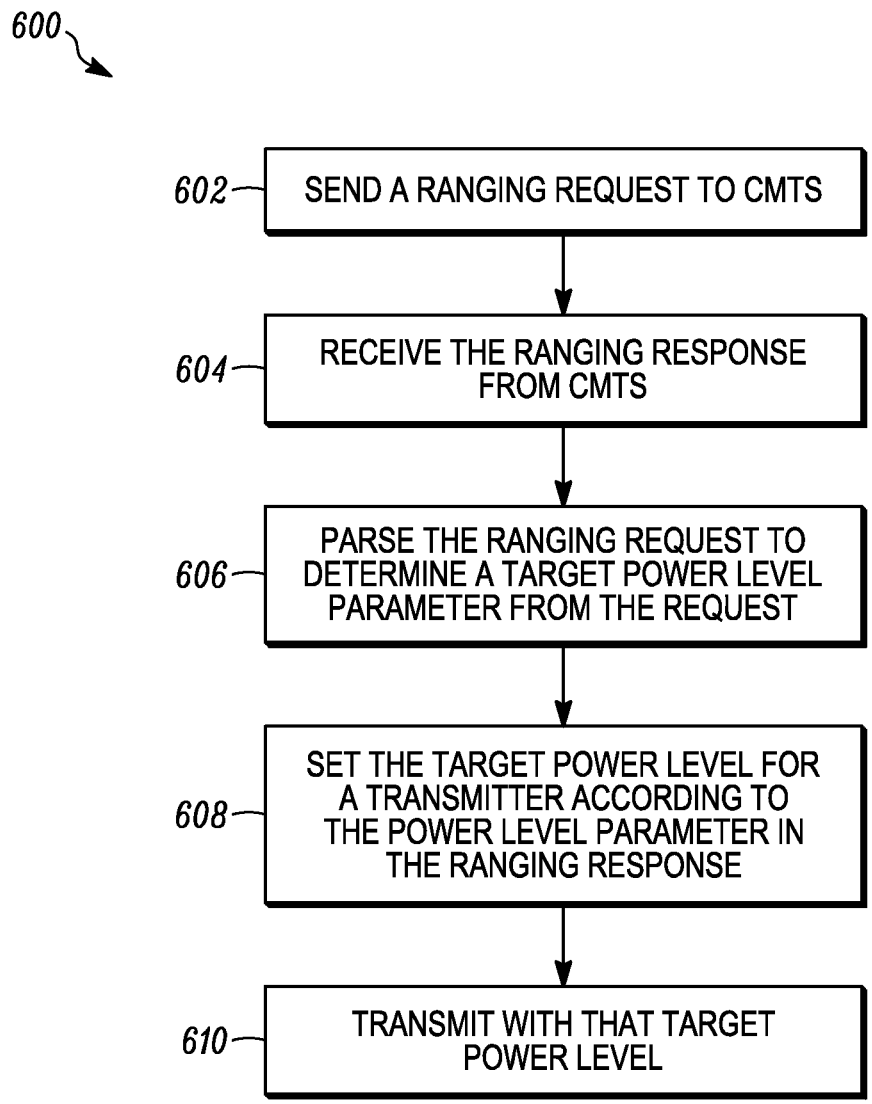
FIG. 6 depicts a simplified flowchart of a method for adjusting the target power level at the interfering CPE according to one embodiment.

The following now describes the power adjustment from the interfering CPE 104 perspective. FIG. 6 depicts a simplified flowchart 600 of a method for adjusting the target power level at interfering CPE 104 according to one embodiment. At 602, interfering CPE 104 sends a ranging request to CMTS 32. The ranging request may be triggered based on CPE 104 being initialized on the network or may be a periodic maintenance request.

At 604, CPE 104 receives the ranging response from CMTS 32. At 606, power level controller 108 parses the ranging request to determine a target power level parameter from the request.

At 608, power level controller 108 then sets the target power level for transmitter 106 according to the power level parameter in the ranging response. Then, at 610, transmitter 106 transmits with that target power level.

Interfering CPE 104

Figure 7:
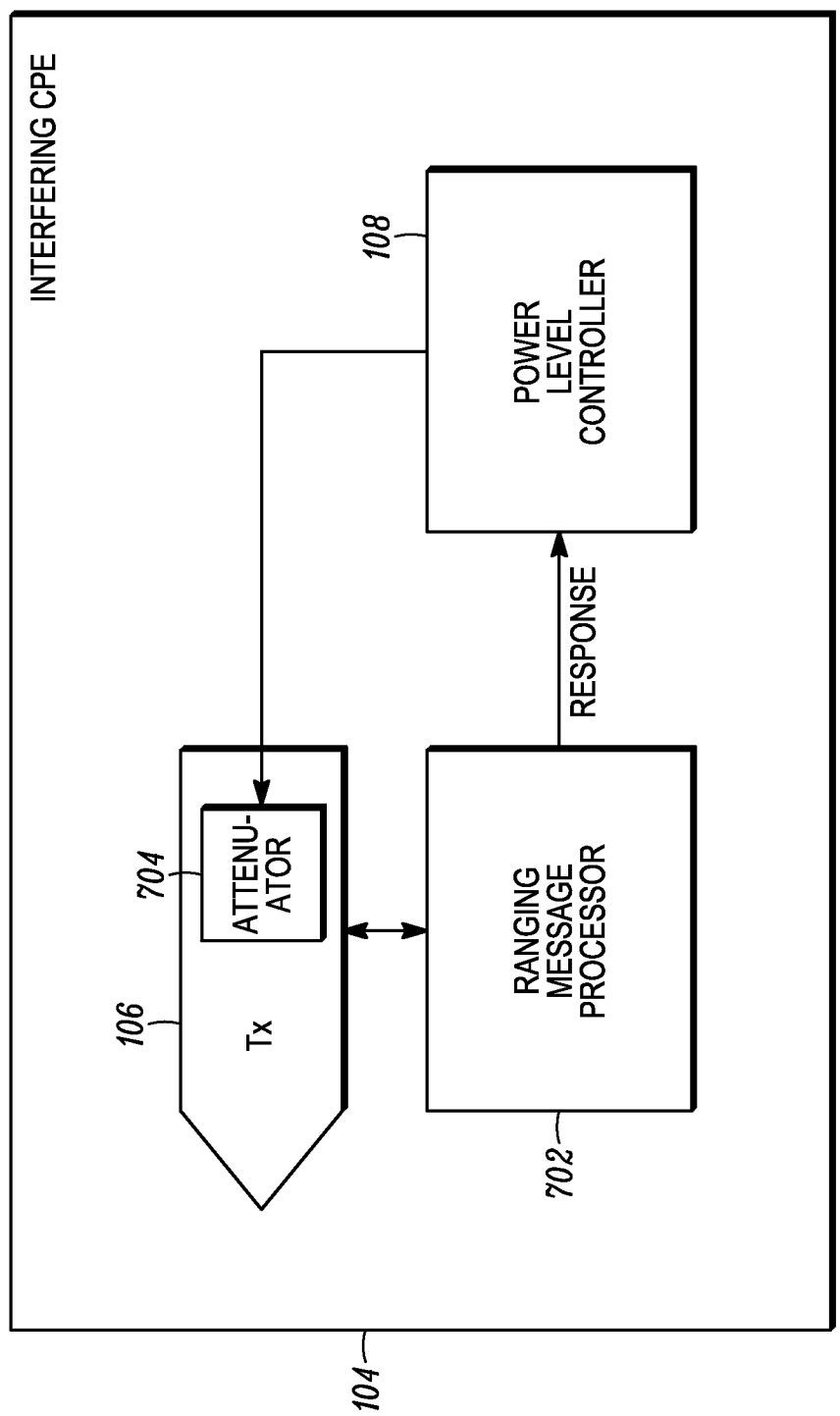
FIG. 7 depicts a more detailed example of the interfering CPE according to one embodiment.

FIG. 7 depicts a more detailed example of interfering CPE 104 according to one embodiment. A ranging message processor 702 may perform the sending of ranging messages and processing of ranging responses as described above. For example, ranging message processor 702 causes transmitter 106 to send ranging request messages to CMTS 32. Also, ranging message processor 702 receives ranging responses from CMTS 32 via transmitter 106.

When a ranging response is received, power level controller 108 receives the response and can parse the response to determine a target power level parameter from the response. Then, power level controller 108 may set a target power level setting at attenuator 704 in transmitter 106. This alters the operation of transmitter 106 such that it transmits at a lower target power level than normal operation when interfering CPE 104 is not transmitting upstream in an interfering spectrum. To alter transmitter 106, hardware logic, such as a programmable attenuator 704, may be included in transmitter 106 such that the transmit power level can be reduced by setting a value of attenuator 704 to reduce the power level.

When transmitter 106 transmits a signal upstream to CMTS 32, attenuator 704 attenuates the signal based on the target power level to reduce the power of the transmitted signal. By reviewing the target power level, transmitter 106 can transmit at a reduced power level when set individually by CMTS 32. It is noted that each CPE 104 may be configured such that each respective transmitter 106 may be configured with a custom target power level. This allows the reduction of the target power level on a per-CPE basis only when an interfering CPE 104 is determined to transmit upstream in the interfering spectrum.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   identifying, by a computing device, a first customer premise equipment in a premises that transmits upstream content within a frequency channel in a frequency spectrum, wherein the frequency spectrum is used by second customer premise equipment to receive downstream content;
   receiving, by the computing device, a request from the first customer premise equipment, the request requiring a response from the computing device;
   identifying, by the computing device, a first target power level for the first customer premise equipment based on the identifying of the first customer premise equipment as transmitting upstream content within the frequency channel in the frequency spectrum that interferes with the second customer premise equipment receiving downstream content, the first target power level being lower than a second target power level selected for other customer premise equipment that are not transmitting interfering upstream content within the frequency spectrum; and
   sending, by the computing device, adjustments to achieve the first target power level to the first customer premise equipment, wherein the first customer premise equipment configures a transmitter of the first customer premise equipment to transmit upstream content based on the first target power level.

2. The method of claim 1, wherein the first customer premise equipment is located in a same premises as the second customer premise equipment.

3. The method of claim 2, wherein:
   the first customer premise equipment is coupled to the second customer premise equipment via a splitter, and the upstream content transmitted by the transmitter of the first customer premise equipment is reflected in a reflected signal through the splitter to the second customer premise equipment.

4. The method of claim 3, wherein:
   a third power level of the reflected signal is reduced compared to if the second power level was used to transmit the upstream content.

5. The method of claim 1, wherein:
   the first customer premise equipment is coupled to the second customer premise equipment via a tap outside of the premises including the first customer premise equipment, and
   the upstream content transmitted by the transmitter of the first customer premise equipment is reflected in a reflected signal through the tap to the second customer premise equipment.

6. The method of claim 5, wherein:
   a third power level of the reflected signal is reduced compared to if the second power level was used to transmit the upstream content.

7. The method of claim 6, wherein:
   the tap comprises a first tap, and
   the first customer premise equipment is coupled to the second customer premise equipment via a second tap coupled to the first tap outside of the premises including the first customer premise equipment.

8. The method of claim 1, wherein identifying the first customer premise equipment comprises:
   identifying characteristics for the first customer premise equipment; and
   determining when the characteristics indicate the first customer premise equipment transmits interfering upstream content within the frequency channel in the frequency spectrum.

9. The method of claim 8, wherein the characteristics comprise information for a type of customer premise equipment.

10. The method of claim 1, wherein identifying the first customer premise equipment comprises:
    identifying a flag in a profile for the first customer premise equipment; and
    determining that the flag indicates the first customer premise equipment transmits interfering upstream content within the frequency channel in the frequency spectrum.

11. The method of claim 1, wherein identifying the first customer premise equipment comprises:
    receiving provisioning information for the first customer premise equipment, the provisioning information provisioning the first customer premise equipment on the computing device; and
    determining when the provisioning information indicates the first customer premise equipment transmits interfering upstream content within the frequency channel in the frequency spectrum.

12. The method of claim 1, wherein the frequency spectrum comprises 54 megaHertz (MHz) to 85 MHz.

13. The method of claim 12, wherein the frequency channel comprises a 6.4 MHz channel.

14. The method of claim 1, wherein the frequency channel is fully within the frequency spectrum.

15. The method of claim 1, wherein the first customer premise equipment uses the adjustments to configure an attenuator in the transmitter to attenuate upstream content transmitted to the computing device to achieve the first target power level.

16. An apparatus comprising:
one or more computer processors; and
a non-transitory computer-readable storage medium containing instructions that, when executed, control the one or more computer processors to be configured for:
identifying a first customer premise equipment in a premises that transmits upstream content within a frequency channel in a frequency spectrum, wherein the frequency spectrum is used by second customer premise equipment to receive downstream content;
receiving a request from the first customer premise equipment, the request requiring a response from the apparatus;
identifying a first target power level for the first customer premise equipment based on the identifying of the first customer premise equipment as transmitting upstream content within the frequency channel in the frequency spectrum that interferes with the second customer premise equipment receiving downstream content, the first target power level being lower than a second target power level selected for other customer premise equipment that are not transmitting interfering upstream content within the frequency spectrum; and
sending adjustments to achieve the first target power level to the first customer premise equipment, wherein the first customer premise equipment configures a transmitter of the first customer premise equipment to transmit upstream content to arrive at the first target power level.

17. A system comprising:
a first customer premise equipment configured to transmit upstream content within a frequency channel using a first frequency split;
a second customer premise equipment configured to transmit upstream content using a second frequency split, wherein the frequency channel is within an interfering frequency spectrum used by the second customer premise equipment to receive downstream content; and
a head end comprising:
one or more computer processors; and
a non-transitory computer-readable storage medium containing instructions that, when executed, control the one or more computer processors to be configured for:
receiving a request from the first customer premise equipment, the request requiring a response from the head end;
identifying a first target power level for the first customer premise equipment based on identifying of the first customer premise equipment as transmitting upstream content within the frequency channel in the interfering frequency spectrum that interferes with the second customer premise equipment receiving downstream content, the first target power level being lower than a second target power level selected for the second customer premise equipment;
sending adjustments to achieve the first target power level to the first customer premise equipment, wherein the first customer premise equipment configures a transmitter of the first customer premise equipment to transmit upstream content to arrive at the head end at the first target power level.

18. The system of claim 17, wherein the first customer premise equipment is located in a same premises as the second customer premise equipment.

19. The system of claim 18, wherein:
the first customer premise equipment is coupled to the second customer premise equipment via a splitter, and
the upstream content transmitted by the transmitter of the first customer premise equipment is reflected in a reflected signal through the splitter to the second customer premise equipment.

20. The system of claim 17, wherein:
the first customer premise equipment is coupled to the second customer premise equipment via a tap outside of the premises including the first customer premise equipment, and
the upstream content transmitted by the transmitter of the first customer premise equipment is reflected in a reflected signal through the tap to the second customer premise equipment.

* * * * *